United States Patent [19]

Chung

[11] Patent Number: 5,183,290
[45] Date of Patent: Feb. 2, 1993

[54] AUTOMATIC SEAT BELT ASSEMBLY FOR A VEHICLE

[76] Inventor: Tae K. Chung, 473-9 Youngo-Ri, Jichun-Myun, Chilgok-Kun, Gyungbuck, Rep. of Korea

[21] Appl. No.: 743,030

[22] Filed: Aug. 9, 1991

[30] Foreign Application Priority Data

Mar. 12, 1991 [KR] Rep. of Korea ............... 91-4035

[51] Int. Cl.⁵ .................. B60R 22/04; B60R 22/08
[52] U.S. Cl. .................. 280/802; 280/803; 280/804; 297/469; 297/483
[58] Field of Search ............ 280/802, 803, 804, 807, 280/808; 297/469, 468, 483

[56] References Cited

U.S. PATENT DOCUMENTS

| | | | |
|---|---|---|---|
| 4,070,040 | 1/1978 | Igeta | 280/804 |
| 4,223,914 | 9/1980 | Usami et al. | 280/803 |
| 4,278,273 | 7/1981 | Schiff | 280/802 |
| 4,483,553 | 11/1984 | Nogiura et al. | 280/803 |
| 4,508,362 | 4/1985 | Higuchi | 280/804 |
| 4,730,844 | 3/1988 | Patterson | 280/802 |
| 4,898,402 | 4/1990 | Igarashi et al. | 280/804 |
| 5,002,150 | 3/1991 | Willis | 180/268 |
| 5,020,856 | 6/1991 | George | 297/483 |

FOREIGN PATENT DOCUMENTS

0261559 11/1987 Japan ...................... 280/804

Primary Examiner—Charles A. Marmor
Assistant Examiner—Paul Dickson
Attorney, Agent, or Firm—Birch, Stewart, Kolasch & Birch

[57] ABSTRACT

An automatic seat belt device for motor vehicles, includes a retracting member installed on a vehicle door, and upper and lower webbings wherein each lower end thereof is unified into a composite structure for slidably locking with a seat belt lock and each upper end thereof is movably connected to the retracting member, whereby the upper and lower webbings can be fitted to or released from the seated occupant as the vehicle door is closed or opened.

1 Claim, 3 Drawing Sheets

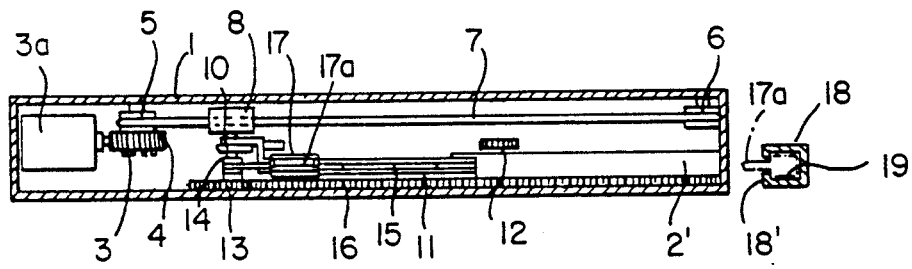
FIG. 6
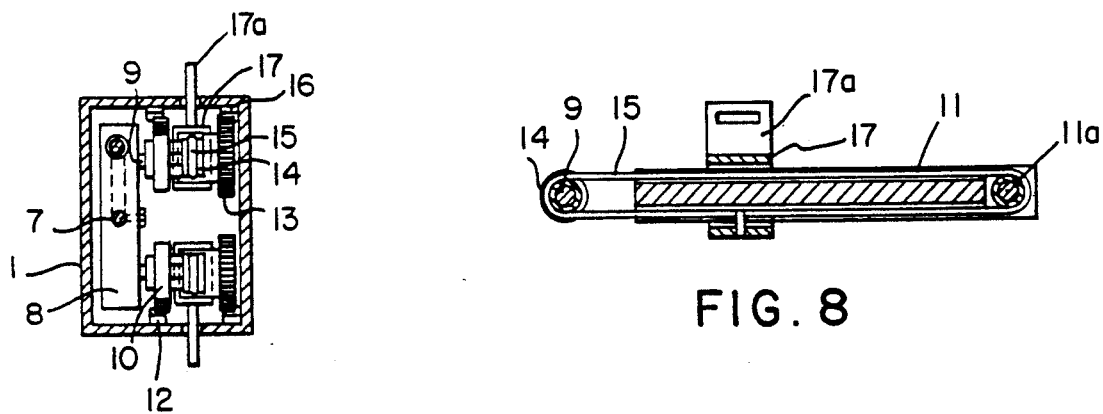
FIG. 7
FIG. 8
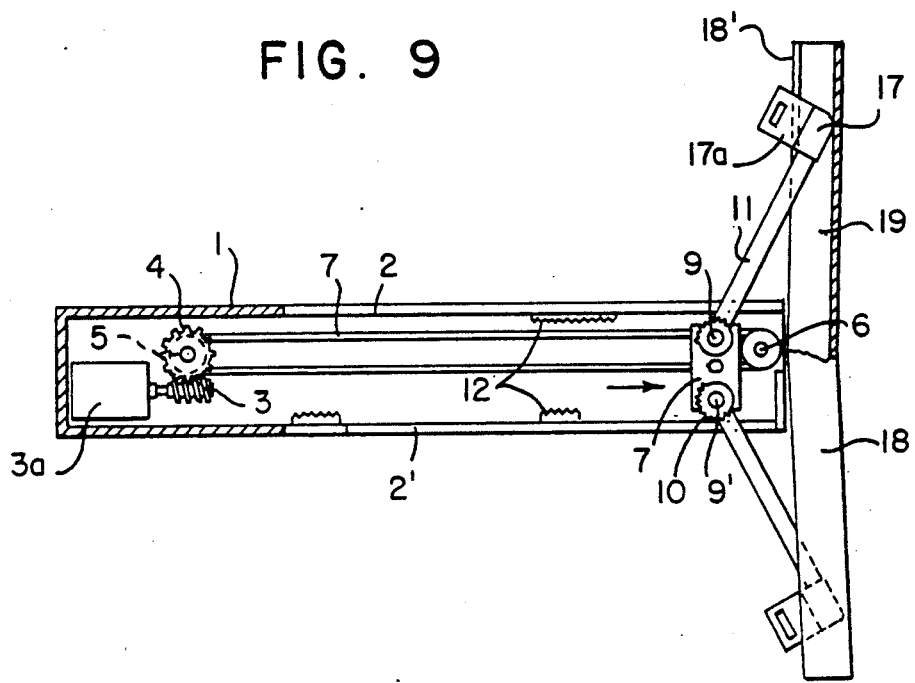
FIG. 9

AUTOMATIC SEAT BELT ASSEMBLY FOR A VEHICLE

SUMMARY OF THE INVENTION

1. Field of the Invention

The present invention relates to an automatic seat belt assembly for vehicles and more particularly, a seat belt system for motor vehicles, which includes upper and lower webbings for restraining an occupant, which are retracted up by a retracting member installed on the interior of a vehicle door so that the webbings can be fitted to or released from the occupant seated on a vehicle seat as the vehicle door is closed or opened.

2. Description of the Prior Art

Various types of automatic seat belt devices are well known in the art. Such seat belt devices include one end of webbing for restraining an occupant, which is wound up by a retractor installed on a body frame or a door so that the webbing can be fitted to or released from the seated occupant as the vehicle door is closed or opened.

Such conventional seat belt devices installed on a body frame are shown, for example, in U.S. Pat. Nos. 4,898,402 and 5,002,150. Also, such conventional seat belt devices installed on a vehicle door are shown, for example, in U.S. Pat. Nos. 4,223,914 and 4,508,362. However, these conventional seat belt devices cannot tightly, comfortably, and completely fit the seated occupant as the vehicle door is closed. Furthermore, these conventional seat belt devices are complicated in construction and expensive to manufacture.

SUMMARY OF THE INVENTION

Accordingly, it is an object of the present invention to provide an automatic seat belt device for motor vehicles which eliminates the above problems encountered in a conventional automatic seat belt device.

Another object of the present invention is to provide a seat belt assembly for motor vehicles, which includes upper and lower webbings for restraining an occupant, which are retracted up by a retracting member installed on a vehicle door so that the upper and lower webbings can be fitted to or released from the seated occupant as the vehicle door is closed or opened.

A further object of the present invention is to provide an automatic seat belt device for motor vehicles, which is simple in construction, inexpensive to manufacture, and durable in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an automatic seat belt device for motor vehicles, includes a retracting member installed on a vehicle door, and upper and lower webbings wherein both lower ends thereof are combined to become a composite structure for slidable locking in an emergency release buckle and the upper ends thereof are movably connected to the retracting member, whereby the upper and lower webbings can be fitted to or released from the occupant seated within the vehicle as the vehicle door is closed or opened.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a horizontally sectional view of the retracting member of the automatic seat belt assembly according to the present invention;

FIG. 7 is a vertically sectional view of a moving box of the retracting member of the automatic seat belt assembly according to the present invention;

FIG. 8 is a vertically sectional view of the moving rod of the retracting member of the automatic seat belt assembly according to the present invention; and FIG. 9 is a vertically sectional view of the retracting member of the automatic seat belt assembly according to the present invention.

DESCRIPTION OF THE PREFERRED EMBODIMENTS

Figure 1:
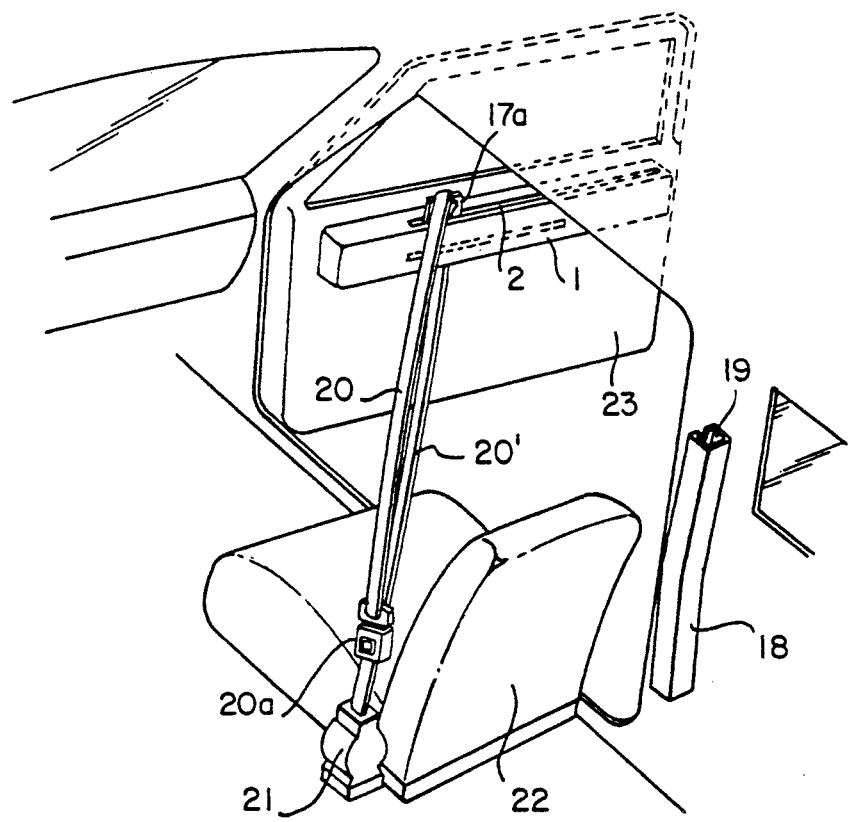
FIG. 1 is a perspective view of the automatic seat belt assembly according to the present invention.
Figure 2:
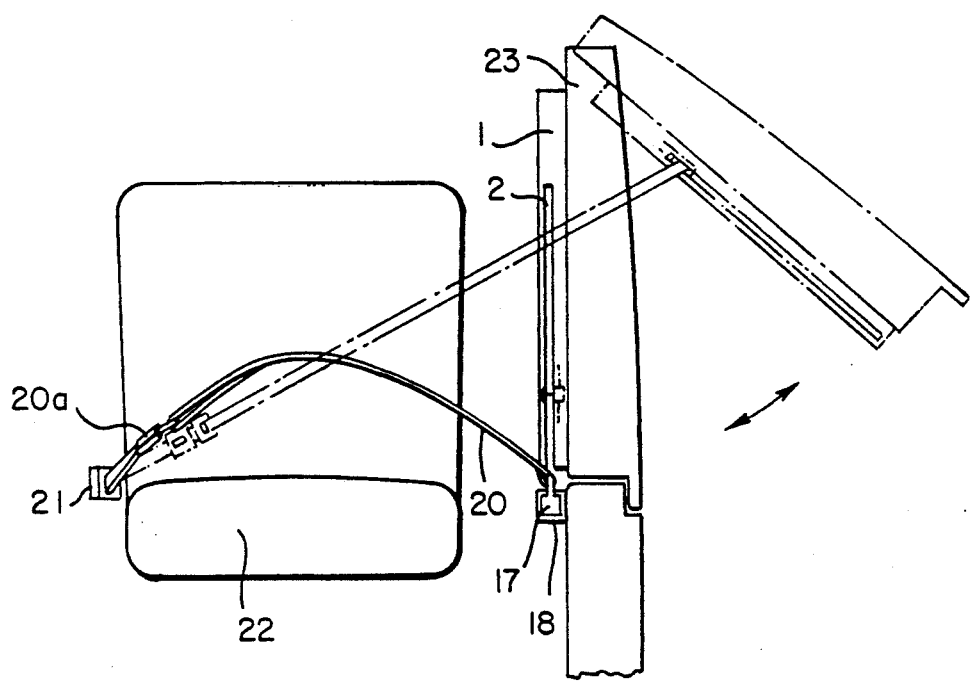
FIG. 2 is a top plane view of the automatic seat belt assembly according to the present invention.
Figure 3:
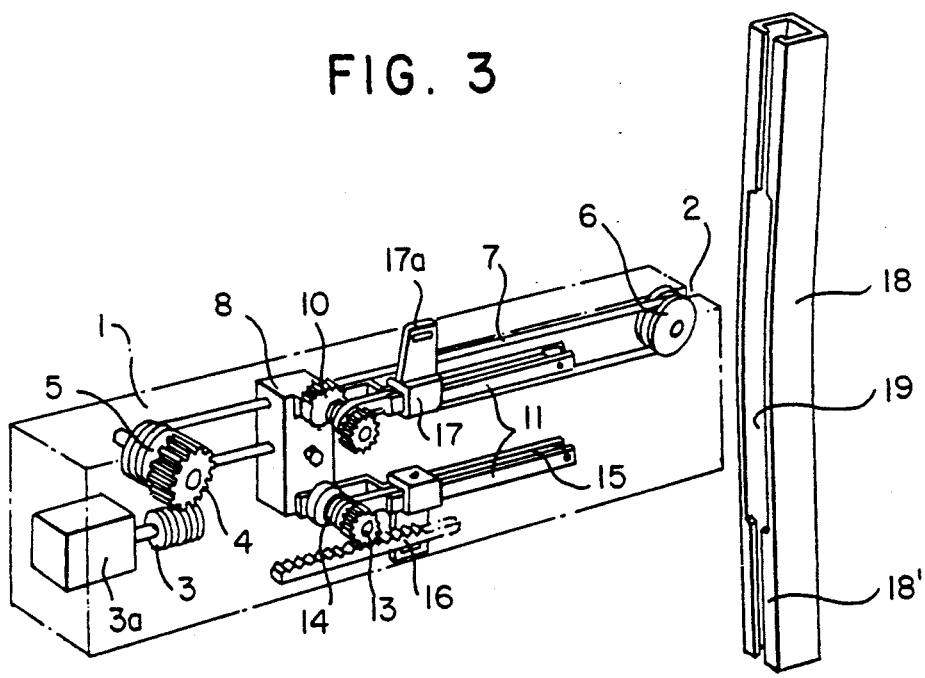
FIG. 3 is an enlarged perspective view of the automatic seat belt assembly containing cut-away portions in order to illustrate the construction of the apparatus of the present invention.

Referring now in detail to the drawings for the purpose of illustrating preferred embodiments of the present invention, the automatic seat belt assembly for a motor vehicle having at least one vehicle door, one vehicle seat, and one seat belt lock as shown in FIGS. 1, 2, and 3, comprises a retracting member 1 installed on an interior of the vehicle door 23 including a horizontal upper channel 2 and a horizontal lower channel 2' (FIG. 5), a guide member 18 vertically adjacent to the rear end of the retracting member 1, and an upper webbing 20 and a lower webbing 20' wherein each upper end of the upper and lower webbings 20 and 20' is connected to upper and lower moving latches 17 which are slidably, movably engaged with both channels 2 and 2' respectively and both lower ends of the upper and lower webbings 20 and 20' are secured to a seat belt latch 20a for slidably inserting into an emergency release buckle 21.

Figure 4:
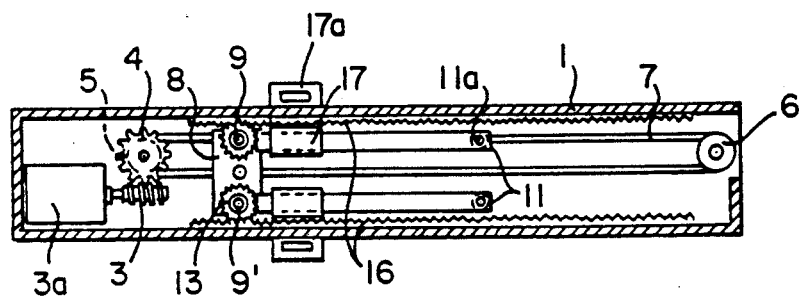
FIG. 4 is a vertically sectional view of a retracting member of the automatic seat belt assembly according to the present invention.

As shown in FIGS. 3 and 4, the retracting member 1 includes a worm gear 4 for rotating by gearing with a worm 3 through a two-way motor 3a, a coaxial driving pulley 5 for operatively connecting to a connecting pulley 6 through a first wire 7, and a moving box 8 fixed to the first wire 7 for easily moving forward or backward along the first wire 7.

Figure 5:
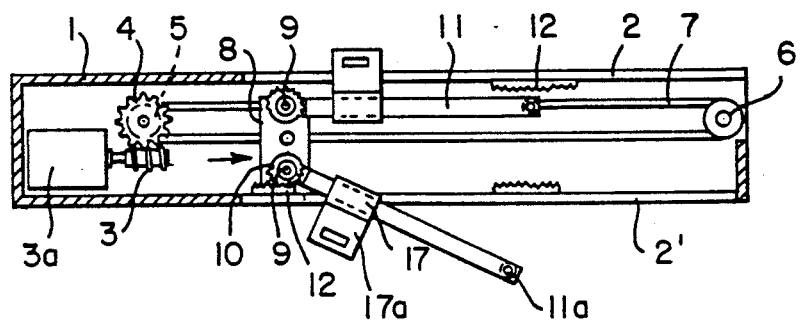
FIG. 5 is a vertically sectional view of the retracting member of the automatic seat belt assembly showing the operation of a low moving rod connected to a lower webbing of the automatic seat belt assembly according to the present invention.

The moving box 8 is provided with an upper shaft 9 and a lower shaft 9' fixed to a sidewall thereof. Each spur gear 10 is rotatably attached to the shafts 9 and 9', respectively, for adjusting an angle of each moving rod 11 movably received the upper and lower moving latches 17 and disposed in a geared relationship with a plurality of short rack gear 12 disposed on the internal ceiling and base of the retracting member 1 (FIG. 5).

As shown in FIGS. 6, 7, and 8, each pinion gear 13 rotatably attached to the shafts 9 and 9' is in gearing relationship with an elongated rack gear 16 disposed on the internal ceiling and base of the retracting member 1 and separately disposed from the short rack gears 12. Each coaxial gear 14 rotated by the pinion gear 13 makes each roller 11a through a second wire 15 to rotate, respectively. Therefore, the upper and lower webbings 20 and 20' can move along the upper and lower moving latches 17 because each upper end of the webbings 20 and 20' is fixed to the seat belt latch 17a of the moving latches 17, respectively. Thereafter, the upper and lower moving latches 17 are slidably inserted into a center hollow portion 19 and separately inserted into upper and lower channeled stoppers 18'. At that time, the vehicle door 23 is completely closed and the webbings 20 and 20' are fitted to the occupant seated on the vehicle seat 22.

The automatic seat belt assembly according to the present invention operates as follows:

As shown in FIG. 1, when the vehicle door 23 is opened, the upper and lower moving latches 17 fixed to the upper and lower webbings 20 and 20' at the upper and lower seat belt latches 17a of the moving latches 17 move forward along the upper and lower channels 2 and 2' of the retracting member 1. Accordingly, the seat belt is released for the occupant to move into the motor vehicle. Thereafter, when the vehicle door 23 is closed, as shown in FIG. 5, the two-way motor 3a is actuated to drive in the counter-clockwise direction so that the worm 3 rotates and thus rotating the worm gear 4 too. Therefore, the moving box 8 moves backward away from the front portion of the retracting member 1 in a direction indicated by an arrow as shown in FIG. 5.

At this time, as shown in FIG. 6, the pinion gears 13 gear into the elongated rack gears 16, respectively. Therefore, the coaxial gears 14 rotate and the second wire 15 move so that the upper and lower moving latches 17 move backward. At this time, the lower spur gear 10, first of all, gears into the first short rack gear 12 so that the lower moving rod 11 is down first (FIG. 5) and correspondingly, the lower webbing 20' is nearly fitted to the seated occupant. Thereafter, according to the backward movement of the moving box 8, the upper and lower spur gears 10 gear first into the upper and second the lower short rack gears 12 so that the upper and lower moving rods 11 are gradually separated from each other and on the other hand, the upper and lower moving latches 17 move to the end portion thereof. At last, the upper and lower moving latches 17 disposed at the end portions thereof slidably pass along the center hollow portion 19 and move up to the channeled stoppers 18' as shown in FIG. 9. At that time, the motor 3a is deactivated and the upper and lower webbings 20 and 20' are tightly, comfortably fitted to the occupant seated on the vehicle seat 22.

In turn, when the vehicle door 23 is opened, the two-way motor 3a is actuated to drive in the clockwise direction so that the moving box 8 moves forward. Therefore, the webbings 20 and 20' are released from the occupant seated on the seat 22 of the motor vehicle.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claim.

What is claimed is:

1. An automatic seat belt assembly for a motor vehicle having at least one vehicle door, one vehicle seat, and one emergency release buckle, said automatic seat belt assembly comprising:
    upper and lower webbings defining lower ends combined by a seat belt latch for locking in said emergency release buckle, and upper ends fixed to tongues of upper and lower moving latches,
    a vertically elongated guide member having a hollow portion and upper and lower channeled stoppers communicated with said hollow portion, and
    a retracting member installed on said vehicle door, said retracting member including:
        a housing having upper and lower slits disposed on a top and bottom thereof,
        a two-way motor supported on an internal front wall of said housing, said two-way motor having a worm,
        a driving pulley having a coaxial worm gear disposed in a geared relationship with said worm, said driving pulley operatively connected to a connecting pulley by a first wire, said connecting pulley supported on an internal back wall of said housing,
        a moving box fixed to said first wire, said moving box having a pair of coaxial pinion gears disposed in a geared relationship with a pair of elongated rack gears supported on a ceiling and a base of said housing and a pair of coaxial spur gears disposed in a geared relationship with at least one short rack gear supported on the internal ceiling and base of said housing, and
        a moving rod attached to each of said spur gears, each moving rod having a roller and a second wire rotatably connected to said spur gear and said roller, said second wires secured to said moving latches, respectively,
    whereby, when the vehicle door is closed, the two-way motor rotates in a counter-clockwise direction, the moving box moves towards said back wall, and simultaneously, the moving latches move towards said back wall to ends of the moving rods and thereafter, both moving latches move up to the channeled stoppers so that the upper and lower webbings are fitted to the occupant seated on the vehicle seat, and in turn, when the vehicle door is opened, the two-way motor rotates in a clockwise direction, the moving box moves towards said front wall, and simultaneously, the moving latches release from the channeled stoppers and move towards said front wall so that the upper and lower webbings are released from the occupant seated on the vehicle seat.

* * * * *